US008957790B2

(12) United States Patent
Cornell et al.

(10) Patent No.: US 8,957,790 B2
(45) Date of Patent: Feb. 17, 2015

(54) SYSTEM AND METHOD FOR CRUISE MONITORING AND ALERTING

(75) Inventors: Bradley D. Cornell, Lake Stevens, WA (US); Michael E. Dey, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 773 days.

(21) Appl. No.: 12/349,049

(22) Filed: Jan. 6, 2009

(65) Prior Publication Data

US 2010/0174424 A1 Jul. 8, 2010

(51) Int. Cl.
G08B 23/00 (2006.01)
G01C 23/00 (2006.01)
G08G 1/16 (2006.01)
G08G 5/00 (2006.01)

(52) U.S. Cl.
CPC ............... *G01C 23/00* (2013.01); *G08G 1/167* (2013.01); *G08G 5/0013* (2013.01); *G08G 5/0082* (2013.01)
USPC ............................................... 340/964; 701/3

(58) Field of Classification Search
USPC .......... 701/3, 29, 29.1, 29.2, 29.4, 32.3, 32.4, 701/32.7, 33.4, 33.7, 33.8, 33.9, 34.1; 340/945, 963, 964
See application file for complete search history.

(56) References Cited

U.S. PATENT DOCUMENTS

| 3,713,090 | A | * | 1/1973 | Dickinson | 340/945 |
| 3,979,057 | A | * | 9/1976 | Katz et al. | 708/130 |
| 4,312,041 | A | * | 1/1982 | DeJonge | 701/123 |
| 4,970,683 | A | * | 11/1990 | Harshaw et al. | 715/841 |
| 5,057,834 | A | * | 10/1991 | Nordstrom | 340/963 |
| 5,243,339 | A | | 9/1993 | Graham et al. | |
| 5,454,074 | A | * | 9/1995 | Hartel et al. | 715/710 |
| 5,457,800 | A | * | 10/1995 | Howells et al. | 710/240 |
| 5,646,843 | A | * | 7/1997 | Gudat et al. | 701/3 |
| 5,710,559 | A | * | 1/1998 | Krogmann | 340/963 |
| 5,900,827 | A | | 5/1999 | Graham et al. | |
| 6,609,082 | B2 | * | 8/2003 | Wagner | 702/182 |
| 6,633,801 | B1 | * | 10/2003 | Durlacher et al. | 701/9 |
| 6,799,110 | B2 | * | 9/2004 | Hashimoto et al. | 701/62 |
| 6,803,861 | B2 | * | 10/2004 | Flick | 340/989 |
| 6,828,921 | B2 | | 12/2004 | Brown et al. | |
| 6,885,919 | B1 | * | 4/2005 | Wyant et al. | 701/21 |

(Continued)

FOREIGN PATENT DOCUMENTS

EP 1318492 A2 * 6/2003
WO 2006/068962 6/2006

OTHER PUBLICATIONS

PCT International Search Report and Written Opinion for corresponding International Application No. PCT/US2009/069340 mailed May 7, 2010, 13 Pages.

*Primary Examiner* — David E Allred
(74) *Attorney, Agent, or Firm* — Patterson & Sheridan, LLP

(57) ABSTRACT

A monitoring system is disclosed for use with a mobile platform being operated by an operator. The system may make use of a database for containing operational information and procedures relating to the operation of the mobile platform by the operator. A processor may also be used that communicates with the database and with at least one subsystem of the mobile platform for monitoring operational information concerning operation of the mobile platform against stored information contained in the database. The processor may determine if the operation of the mobile platform is proceeding in accordance with predetermined standards.

15 Claims, 2 Drawing Sheets

(56) References Cited

U.S. PATENT DOCUMENTS

| | | | |
|---|---|---|---|
| 7,145,477 B1* | 12/2006 | McBain | 340/945 |
| 7,711,457 B2* | 5/2010 | Caillaud | 701/5 |
| 7,715,961 B1* | 5/2010 | Kargupta | 701/33 |
| 7,962,254 B2* | 6/2011 | Bouchet et al. | 701/4 |
| 7,969,327 B2* | 6/2011 | Christophe et al. | 340/963 |
| 8,255,098 B2* | 8/2012 | Jones et al. | 701/11 |
| 2005/0171663 A1* | 8/2005 | Mittelsteadt et al. | 701/35 |
| 2005/0187677 A1* | 8/2005 | Walker | 701/16 |
| 2005/0261811 A1* | 11/2005 | Artini et al. | 701/3 |
| 2005/0283286 A1* | 12/2005 | Kanda et al. | 701/29 |
| 2005/0288895 A1* | 12/2005 | Petit | 702/182 |
| 2006/0022845 A1* | 2/2006 | Fischer | 340/945 |
| 2006/0195235 A1 | 8/2006 | Ishihara et al. | |
| 2007/0089067 A1* | 4/2007 | Abbott et al. | 715/786 |
| 2007/0135978 A1* | 6/2007 | Kim et al. | 701/29 |
| 2007/0150119 A1* | 6/2007 | Mitchell et al. | 701/1 |
| 2008/0319602 A1* | 12/2008 | McClellan et al. | 701/33 |
| 2010/0152961 A1* | 6/2010 | Atri et al. | 701/33 |
| 2010/0161157 A1* | 6/2010 | Guilley et al. | 701/3 |
| 2010/0179844 A1* | 7/2010 | LaFergola et al. | 705/7 |
| 2010/0191403 A1* | 7/2010 | Krause | 701/29 |
| 2011/0148665 A1* | 6/2011 | Dehais et al. | 340/963 |
| 2012/0046982 A1* | 2/2012 | Wellman | 705/7.12 |
| 2012/0075122 A1* | 3/2012 | Whitlow et al. | 340/963 |

* cited by examiner

SYSTEM AND METHOD FOR CRUISE MONITORING AND ALERTING

FIELD

The present disclosure relates to systems that monitor the performance a mobile platform and of a crew member operating the mobile platform, and more particularly to a system and method that monitors the performance of a crew member and an aircraft and provides an alert if the performance of the aircraft or crew member differs from an expected performance.

BACKGROUND

The statements in this section merely provide background information related to the present disclosure and may not constitute prior art.

When the jet transport era was launched in the 1960s, aircraft system complexity and operating procedures necessitated three crew members to operate the aircraft. Advances in aircraft systems and electronics capability enabled the next generation of aircraft designed in the early 1980s to be operated by a crew of two pilots. Advances in aircraft capability enabled the duties of the third crew member to be automated and the remaining tasks were divided amongst two pilots, allowing safe and efficient operation and actually reducing the number of operational crew errors. When the two-crew flight decks were designed, the certification requirements dictated that all controls and indications required to fly the aircraft would be located, and in some cases duplicated, so that the aircraft could be safely operated by a single crew member from either seated position in the event of a crew member becoming incapacitated.

Crew duties have been divided into what is called the "pilot flying" (or "pilot in command") and "pilot monitoring" (or "pilot not in command"). The pilot flying is responsible for hand flying the aircraft or operation of the aircraft systems used to fly the aircraft during autopilot operation. The pilot monitoring is responsible for communications and cross-checking the pilot flying to make sure mistakes are not inadvertently made and that the aircraft stays on the cleared flight plan. However, with present day commercial transport aircraft most cruise segments are operated with the autopilot engaged. Accordingly, the operational requirements on the crew are much less demanding than during departure, climb, and descent, especially during oceanic and remote cruise flight segments.

In spite of the less demanding operational requirements on the crew, and in order to ensure cross-checking of actions taken or required by the pilot flying, and also to combat fatigue and meet crew duty time regulatory requirements, current long range flights must operate with three or four flight crew members on board. This is so even though only two flight crew members are required to operate the aircraft. The extra "supernumerary" crew members rotate through the pilot flying and pilot monitoring duties, allowing the two primary flight crew members to take rest periods in the passenger cabin or dedicated crew rest facilities in the aircraft. The current method of operating flights with more than two crew members to meet crew duty time limitations significantly increases the cash airplane-related operating costs (CAROC) for an airline.

SUMMARY

In one aspect the present disclosure relates to a monitoring system for use with a mobile platform being operated by an operator. The system may comprise: a database for containing operational information and procedures relating to the operation of the mobile platform by the operator; and a processor in communication with the database and with at least one subsystem of the mobile platform for monitoring operational information concerning operation of the mobile platform against stored information contained in the database, and determining if the operation of the mobile platform is proceeding in accordance with an expected performance.

In another aspect the present disclosure relates to a method for monitoring operation of a mobile platform and alerting at least one operator of the mobile platform when operation of the mobile platform begins to deviate from an expected operation. The method may comprise: using a database for containing operational information and procedures relating to the operation of the mobile platform by the operator; processing information from the database and information concerning operation of the mobile platform to determine if the mobile platform and the operator are following an expected performance course; and when the mobile platform or the individual deviate from the expected performance course, generating an alert to the operator.

In another aspect the present disclosure may involve a method for monitoring operation of a commercial transport aircraft and at least a pilot in command of the aircraft to detect when operation of the aircraft deviates from an expected operation. The method may comprise: using a database for containing operational information and procedures relating to the operation of the mobile platform by the pilot in command; processing information from the database and real time information concerning operation of the aircraft to determine if the aircraft is following an expected performance course; and when the aircraft deviates from the expected performance course, generating a real time alert to the pilot in command informing the pilot in command of the deviation.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
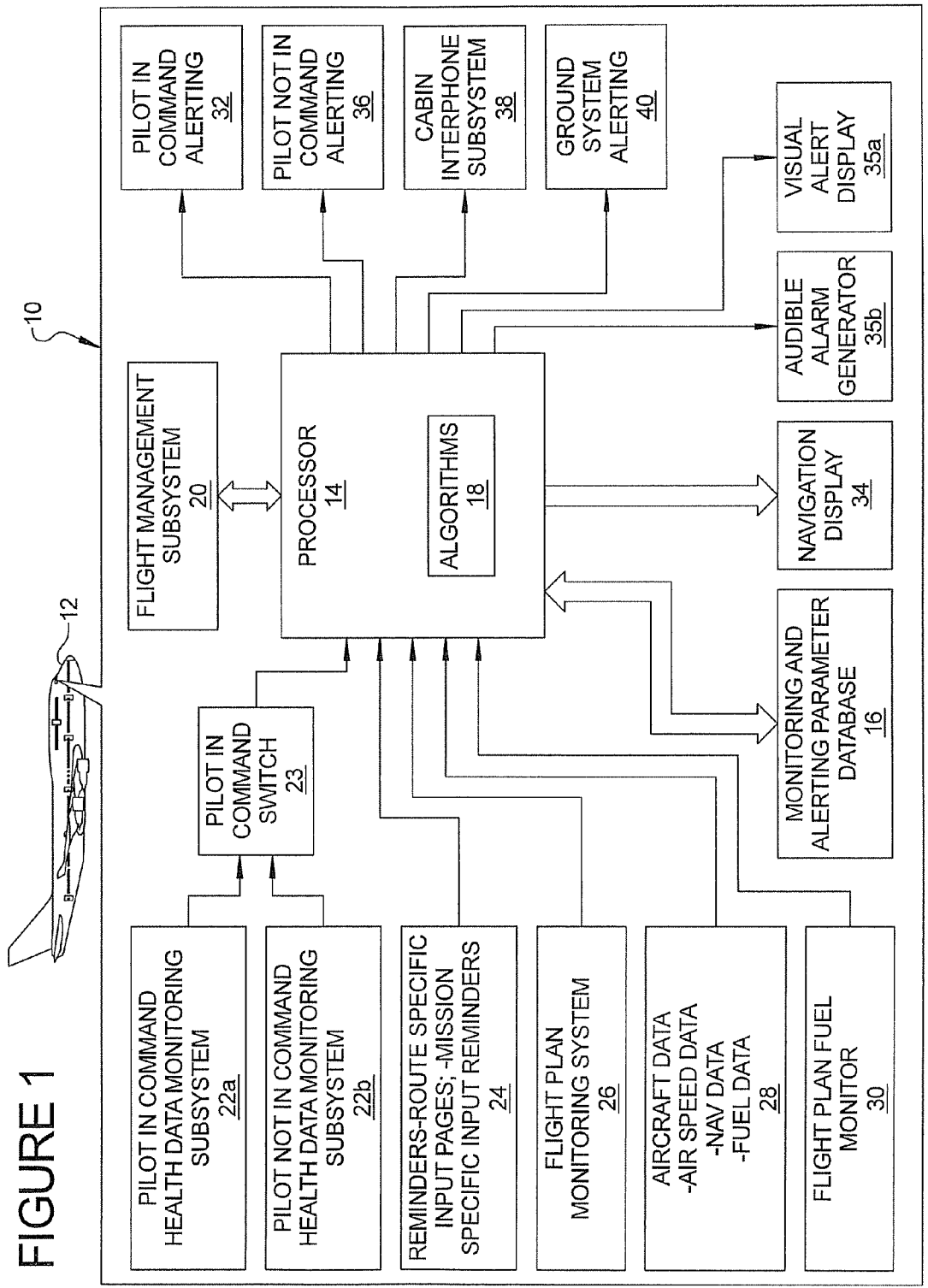
FIG. 1 is a block diagram of a system in accordance with one embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a monitoring and alerting system 10 for use with a mobile platform 12. For convenience the monitoring and alerting system 10 will be referred to throughout the following discussion as simply the "system 10". Also, while the system 10 will be described in connection with the operation of a mobile platform, it will be appreciated that the system 10 could readily be implemented in connection with the operation of fixed machinery or the operation or monitoring of other non-mobile equipment, installations or systems. The system 10 is adaptable to virtually any application where it is desired to monitor the operation of a vehicle, machine or other form of system, or the performance of an operator responsible for operating the vehicle, machine or other form of system. Also, while the following discussion may reference the mobile platform 12 as "aircraft 12", which forms a commercial transport jet aircraft, it will be appreciated that the system 10 could just as readily be employed with any form of mobile platform such as a marine vessel (i.e., surface ship or underwater vessel), a rotorcraft, a land vehicle such as van, truck, car or bus, or other form of airborne vehicles such as rotorcraft and space vehicles. The system 10 may also be employed with manned or unmanned vehicles. At the present time, however, it is anticipated that a particularly desirable implementation of the system 10 will be in connection with the use of commercial transport jet aircraft to enable the number of crew members required to pilot the aircraft to be reduced without affecting the safety of the crew and/or the non-crew passengers travelling on the aircraft 12.

Furthermore, for the purpose of the following discussion the "operator" of the aircraft 12 will be referred to as the "pilot in command". The crew member that assists the pilot in command will be referred to as the "pilot not in command" or the "secondary operator".

Referring further to FIG. 1 the system 10 includes a processor 14 that communicates with a monitoring and alerting parameter database 16. The processor 14 may include one or more specific algorithms 18 that interpret data received by the processor and which provide information back to the processor that it uses to determine if a specific aircraft performance or operator performance criterion is being met, or has not been met.

The processor 14 receives information from a flight management subsystem 20 (typically referred to as a "flight management computer" ("FMC") in the aviation industry) that provides information to the processor 14 concerning flight performance and route data. Typical information received from the flight management subsystem 20 could be route of flight information including waypoint identifies, estimated time of arrival (ETA) times for waypoints, current fuel and projected fuel burn estimates, and automation mode status (i.e. lateral guidance from the flight management subsystem 20, vertical guidance from the flight management subsystem 20, engagement, and thrust mode from the flight management subsystem 20 engagement and sub-mode).

The processor 14 may also receive physiological data concerning the condition of the pilot in command and the pilot not in command, as indicated by subsystems 22a and 22b, respectively. Such data may be provided to the processor 14 via a pilot in command switch 23 that allows the pilot in command (or even the pilot not in command) to select which one will have his/her health data monitored by the processor 14. Of course, a provision may also be made so that the processor 14 monitors the health data from both individuals simultaneously without any switching being required. The health data may relate to pulse data, respiration, blood oxygen level or any other data that may indicate a change in the physiological state of the pilot in command and/or the pilot not in command. In this regard it will be appreciated that suitable health monitoring equipment will need to be attached to the pilot in command (i.e., pilot) and/or pilot not in command (i.e., co-pilot) prior to the operation of the aircraft 12 commencing for such health monitoring data to be generated. The processor 14 receives this information in real time (i.e., virtually instantaneously) and uses the information to monitor the physiological condition of the pilot in command and/or the pilot non in command, depending if one or both individuals are attached to suitable monitoring equipment. If the processor 14 detects a significant physiological change in the health of the person being monitored, then it may generate an alert, which will be more fully described in the following paragraphs.

Various reminder messages, which may not be directly related to a certified portion of the two crew duties but may still be a part of the two crew member duties imposed by an airline to comply with company procedures, may be provided to the processor 14, as indicated by block 24. Such reminder messages may be route specific. For example, such a flight specific message may be a message that a flight is half way to its intended destination, thus requiring the pilot to reply with an acknowledgement to an airline company worker about the status of a particular passenger or some specific cargo carried on the aircraft 12. The reminders may also be specific to a mission in a military operation. For example, such reminders may come immediately after various actions occur during a mission that each requires a response from the pilot in command. The failure of the pilot in command to respond to any one of the reminders within a predetermined time period (e.g., 30 seconds) may then cause the processor 14 to generate a real time alert.

The system 10 may also be integrated with a flight plan monitoring system 26, such as that described in U.S. Pat. No. 6,828,921, assigned to The Boeing Company, and hereby incorporated by reference into the present disclosure. The system 26 provides comprehensive flight plan information to the processor 14 and works in cooperation with the processor 14 to ensure that the processor is apprised of any action (or inaction) by the pilot in command that will cause the aircraft 12 to deviate from a filed flight plan as amended by air traffic control (ATC), which is referred to as the "cleared flight plan".

The system 10 may also make use of various aircraft performance information or data, as indicated at block 28, such as air speed information, navigation data, altitude data, fuel data, and autopilot mode annunciations, etc., that is provided to the processor 14 for monitoring and analysis. If the processor 14 determines that any received information is outside of an expected range or value, the processor 14 may signal a real time alert informing the pilot in command or the pilot not in command of the condition.

Finally the system 10 may calculate specific information based on the data received from the aircraft 12 as indicated at block 30, such as fuel burn compared to the filed flight plan; the fuel burn per waypoint; the Extended Twin Engine Operational range Performance Standards (ETOPS) equal time point (ETP) calculations; three minute out air traffic control (ATC) reporting, etc. The processor 14 may compare this information with other data held in the database 16, with or without the use of the algorithms 18, to determine if any condition has arisen requiring pilot in command input or pilot not in command input, or verifying that an expected input has been received from the pilot in command or the pilot not in command.

It is a principal advantage of the system 10 that the processor 14 is able to generate one or more alerts in the event that the performance of the aircraft 12, or of the pilot in command, deviates from an expected performance. More specifically, the system 10 is able to provide a real time alert when the performance of, or operation of, the aircraft 12 deviates from an expected performance or from airline company specific operating procedures. For example, the system 10 may provide an alert if the flight path of the aircraft begins to deviate from the expected flight path, or if the pilot in command fails to provide an input or perform a periodic check that is required by standard operating procedures (SOPs) at predetermined intervals (e.g., starting the auxiliary power unit (APU) at a predetermined time prior to descent of the aircraft 12).

The system 10 implements what may be viewed as a hierarchical alert scheme. Initially, if an improper action or an inaction on the part of the pilot in command is detected by the processor 14, the processor will provide an alert to the pilot in command, as indicated at block 32. This alert may be provided on a separate visual alert display 35a shown in FIG. 1 (e.g., a light) that the pilot in command can see. If the processor 14 does not detect that the appropriate response has been provided by the pilot in command within a predetermined time period, then the processor 14 may raise the level of the alert. For example, this may involve providing an audible alarm via a separate audible alarm generator 35b (e.g., a speaker) to the pilot in command in addition to the visual alert from display 35a. The audible alarm generator 35b is also shown in FIG. 1. Alternatively, the processor 14 may provide a separate alert to the pilot not in command, as indicated by block 36, that no suitable response was taken by the pilot in command. This alert may be provided on the visual alert display 35a or through the audible alarm generator 35b, or it may even be provided audibly through headphones that the pilot not in command is wearing. Alternatively, or in addition to the alert provided to the pilot not in command, the processor 14 may provide an alert to the cabin staff of the aircraft 12 via a cabin interphone subsystem 38. The cabin interphone subsystem 38 may provide a visual signal or an audible signal that the cabin staff recognizes as meaning that an operational procedure required to be performed by the pilot in command has not taken place, or that performance of the aircraft 12 or of the flight of the aircraft has deviated from an expected course. Still further, the system 10 may provide an alert (i.e., wireless communication) via a ground system alerting subsystem 40 to an air traffic control (ATC) tower that the required response has not been received within the required time frame. The processor 14 may also provide an alert via any of the above described components if any physiological abnormalities are detected from the health data obtained from subsystems 22a and 22b. It will be appreciated that any alert generated by the processor 14 is preferably a real time alert.

Figure 2:
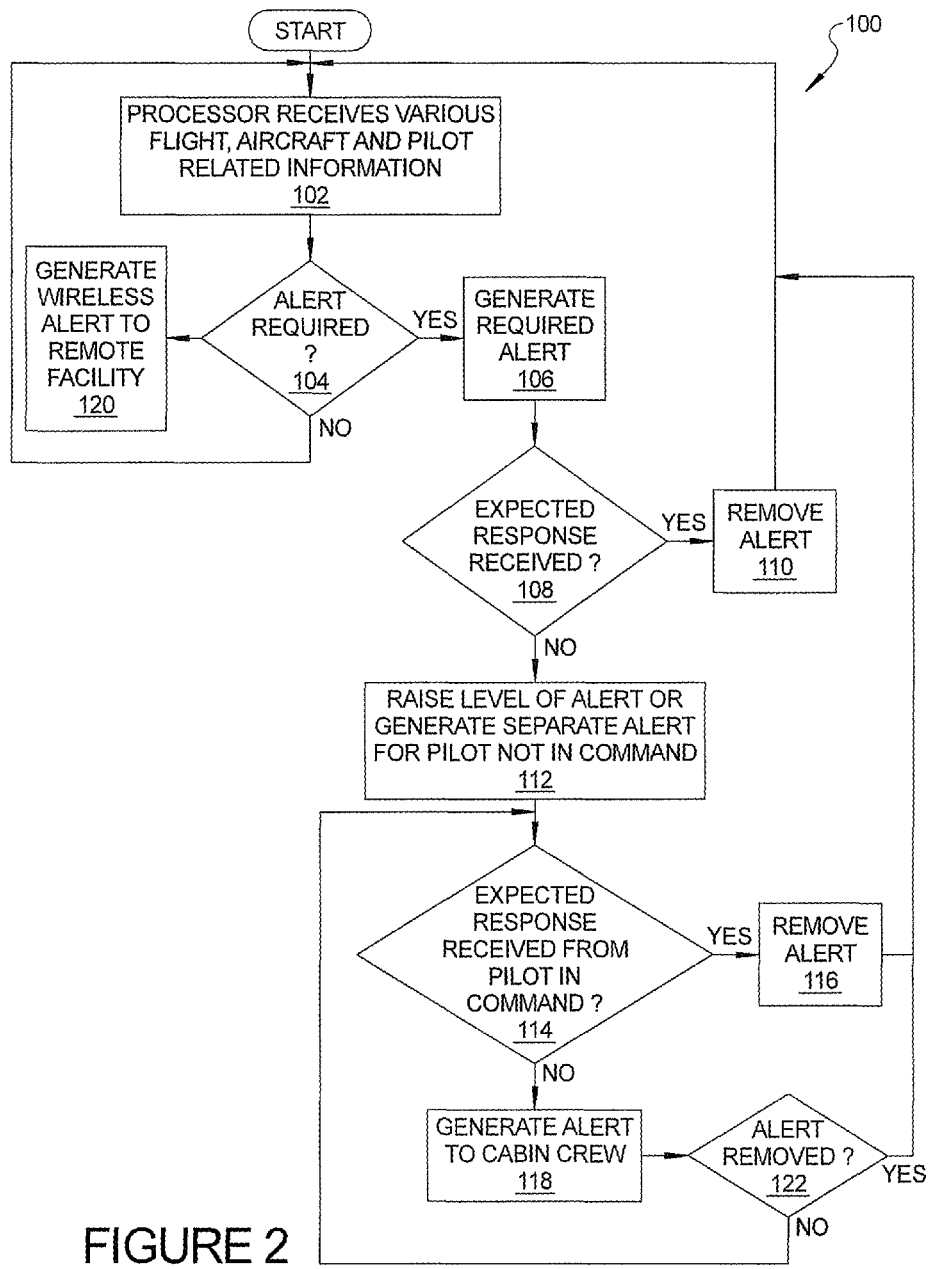
FIG. 2 is a flowchart illustrating operations performed by the system of FIG. 1.

Referring now to FIG. 2, a flowchart 100 is shown illustrating operations that may be performed by the system 10. At operation 102 the processor 14 receives information from the aircraft 12 pertaining to the path of flight of the aircraft, the performance of the various subsystems of the aircraft, and any actions that the pilot in command needs to take or is expected to take at specific time intervals. At operation 104 the processor 14 may use information obtained from the database 16 and the stored algorithms 18 to determine if the path of travel of the aircraft 12, the performance of various subsystems of the aircraft or the performance by the pilot in command, has given rise to a need to generate an alert along with the type of alert required. If the need for an alert has arisen, the processor 14 generates the needed alert to the pilot in command, as indicated at operation 106, and then monitors for the expected response, as indicated at operation 108. If the expected response is received at operation 108, then the alert is removed, as indicated at operation 110, and the monitoring action continues. If an alert has been generated, but the expected response from the pilot in command is not received at operation 108, then either the level of the alert may be raised or a second alert is generated for the pilot not in command, as indicated at operation 112. If the expected input from the pilot in command is then received after a short additional predetermined time (e.g., 30 seconds or less), as indicated at operation 114, then the alert to the pilot not in command is removed, as indicated at operation 116. However, if no response is received by the pilot in command or the pilot not in command after the short additional predetermined time period, as indicated at operation 114, then an additional alert directed to the cabin crew may be generated as indicated at operation 118. Optionally, at any time an alert may be wirelessly transmitted from the aircraft 12 to a remote facility, for example an air traffic control facility or an airline company dispatch center, as indicated by operation 120. If the alert is detected as being removed at operation 122, then the system 10 continues monitoring the received information that is received by the processor 14. If the alert is detected as still existing at operation 122, then the system 10 may continue checking for the expected response from the pilot in command at operation 114.

The system 10 enables a commercial transport aircraft that would normally be required by present day flight regulations for long range flights to have four flight crew members on board to operate safely with two or three flight crew members. For flights where two crew members are required, the system 10 could enable the flight to be performed with a single crew member during the cruise segment, and would also extend the number of operations that can be performed with only two crew members. The system 10 enables this reduction in manpower by essentially performing many monitoring and checking actions that would normally be performed by the pilot not in command. Reducing the number of flight crew needed for a given flight can represent a significant cost savings to an airline operating the aircraft 12. The system 10 also reduces the potential of one or more operational errors (due to human error) of the monitoring function.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A monitoring system for use with a mobile platform being operated by an operator, the system comprising:
    a database on-board the mobile platform for containing operational information and procedures relating to the operation of the mobile platform by the operator; and
    a processor on-board the mobile platform in communication with the database and with at least one subsystem of the mobile platform for monitoring operational information concerning operation of the mobile platform, including;
    monitoring for the operator to perform unsolicited periodic checks in accordance with standard operating procedures of the mobile platform, at one or more expected time intervals while operating the mobile platform, the monitoring of the operational information being performed against stored information contained in said database;
    monitoring for the operator to perform an acknowledgement of a route specific reminder relating to at least one of a status of a specific passenger and a status of a specific cargo item;
    the processor further being configured to determine if the operation of the mobile platform is proceeding in accordance with an expected performance, and generating:

an alert to the operator in command in the event anyone of said periodic checks is not performed by said operator;

determining when the operator in command does not respond to the alert, then raising the level of the alert by notifying an operator not in command of the alert; and determining when the operator not in command and the operator in command both do not respond to the alert, and then generating one of a visual and an audible alarm which is recognizable by a cabin staff individual via a cabin interphone subsystem;

wherein said mobile platform comprises a commercial transport aircraft;

wherein said at least one subsystem of the mobile platform comprises a flight management subsystem of the mobile platform that supplies route data to the processor concerning a route that the aircraft is assigned to follow during a flight; and wherein said flight management subsystem is further adapted to provide at least one of the following to the processor:

a flight plan fuel monitor;

a fuel burn per waypoint;

extended range twin engine operational performance standards (ETOPS) equal time point (ETP) calculations; and three minute out ATC reporting.

2. The system of claim 1, wherein said mobile platform comprises an aircraft; and further comprising a subsystem for generating physiological information related to a condition of a pilot in charge of piloting the aircraft, and supplying said physiological information to said processor.

3. The system of claim 1, wherein said alert comprises at least one of:

an output to a visual alert display of the mobile platform;

an output to an audible alarm generator; and an output to a remotely located control station associated with operation of the mobile platform.

4. The system of claim 1, further comprising a subsystem for storing air traffic control (ATC) clearances received by the aircraft, and for communicating said ATC clearances to said processor.

5. The system of claim 1, wherein said processor further is adapted to receive at least one of the following:

information concerning route specific messages; and information concerning mission specific input reminders.

6. A method for monitoring operation of a mobile platform and alerting at least one an operator in charge of piloting the mobile platform when operation of said mobile platform begins to deviate from an expected operation, said method comprising:

using a database contained on-board the mobile platform for containing operational information and procedures relating to the operation of the mobile platform by the operator in charge;

using a computer, on-board the mobile platform, and associated with a flight management subsystem to process information from said database and information concerning operation of said mobile platform, including monitoring for expected, unsolicited periodic checks to be performed by the operator in charge at predetermined time intervals, in accordance with standard operating procedures for the mobile platform, during operation of the mobile platform, the monitoring determining, without assistance from a ground based monitoring system, if said mobile platform and said operator in charge are following an expected performance course;

further using the computer to monitor for the operator in charge to perform an acknowledgement of a route specific reminder relating to at least one of a status of a specific passenger and a status of a specific cargo item; and when the acknowledgement is not received, generating an alert to the operator in charge;

and when the operator in charge fails to respond to the alert, generating an alert to an operator not in charge of piloting the mobile platform;

the computer further being configured to determine when the operator not in charge of piloting the mobile platform fails to respond to the alert, and then to generate one of a visual and an audible alarm which is recognizable by a cabin staff individual other than the operator responsible for piloting the mobile platform, via a cabin interphone subsystem that provides at least one of a visual signal or an audible signal when a required action has not been detected from the operator in charge of piloting the mobile platform and the operator not in charge of piloting the mobile platform.

7. The method of claim 6, wherein said processing information to determine if said mobile platform and said operator in charge of piloting the mobile platform are following an expected performance course comprises determining if said mobile platform is following a predetermined course of travel.

8. The method of claim 6, wherein said processing information to determine if said mobile platform and said operator in charge of piloting the mobile platform are following an expected performance course comprises determining if said operator in charge of piloting the mobile platform is following the standard operation procedures in operating said mobile platform.

9. The method of claim 6, wherein said operation of generating an alert to said operator in charge of piloting the mobile platform comprises providing said alert on a visual alert display of said mobile platform.

10. The method of claim 6, further comprising monitoring a physiological condition of said operator in charge of piloting the mobile platform and generating an alert if said monitored physiological condition deviates from a predetermined standard.

11. The method of claim 6, wherein said processing information from said database and information concerning operation of said mobile platform comprises processing at least one of:

information pertaining to air traffic control (ATC) clearances received by said mobile platform; and information concerning navigation data from an onboard navigation system of said mobile platform.

12. The method of claim 6, wherein said operation of said on-board computer generating an alert to said operator in charge of piloting the mobile platform comprises at least one of:

generating an alert on a visual alert display of said mobile platform;

generating an audible alert using an audible alarm generator;

generating an alert to the operator not in charge of piloting the mobile platform; and generating an alert that is communicated wirelessly to a remote monitoring facility that is monitoring travel of said mobile platform.

13. A method for monitoring operation of a commercial transport aircraft and at least a pilot in command of the aircraft when operation of said aircraft deviates from an expected operation, said method comprising:

using a database on-board the aircraft for containing operational information and procedures relating to the operation of the aircraft by the pilot in command;

using a computer on-board the aircraft to process information from said database and real time information concerning operation of said aircraft, including;

monitoring for expected, unsolicited inputs from the pilot in command at expected time intervals during operation of the aircraft and in accordance with a standard operating procedure for the aircraft, to determine if said aircraft is following an expected performance course; and monitoring for the pilot in command to perform an acknowledgement of a route specific reminder relating to at least one of a status of a specific passenger and a status of a specific cargo item;

when said at least one of expected, unsolicited inputs is not received by said on-board computer, using said on-board computer to generate a real time alert to said pilot in command informing said pilot in command of said deviation; and when the pilot in command does not respond to the alert, then generating a new alert to a pilot not in command; and when the pilot not in command does not respond to the new alert, then using the on-board computer to generate one of a real time visual alarm and an audible alarm which is recognizable by a cabin crew member when a required action has not been taken by both the pilot in command and the pilot not in command.

14. The method of claim 13, wherein generating a real time alert comprises at least one of:

generating an alert on a visual alert display of said aircraft; and generating an alert that is communicated wirelessly to an air traffic control facility that is tracking travel of said aircraft.

15. The method of claim 13, wherein said expected, unsolicited inputs comprise:

an input pertaining to air traffic control (ATC) clearances received and accepted by said pilot in command of said aircraft; and wherein said on-board computer further considers:

information concerning navigation data from an onboard navigation system of said aircraft; and information concerning predicted fuel burn per waypoint along a predetermined course of travel of said aircraft.

* * * * *